US008366284B2

(12) United States Patent
Flynn et al.

(10) Patent No.: US 8,366,284 B2
(45) Date of Patent: Feb. 5, 2013

(54) VEHICLE MIRROR POWER FOLD MECHANISM

(75) Inventors: Daniel Joseph Flynn, Morphett Vale (AU); Maarten Johannes Schuurmans, Kingswood (AU); Garry Gordon Leslie Fimeri, Morphett Vale (AU)

(73) Assignee: SMR Patents S.a.r.l., Luxembourg (LU)

( * ) Notice: Subject to any disclaimer, the term of this patent is extended or adjusted under 35 U.S.C. 154(b) by 589 days.

(21) Appl. No.: 12/536,013

(22) Filed: Aug. 5, 2009

(65) Prior Publication Data

US 2010/0060024 A1   Mar. 11, 2010

(30) Foreign Application Priority Data

Aug. 5, 2008   (AU) ................................. 2008203505

(51) Int. Cl.
*G02B 7/182* (2006.01)
*B60R 1/06* (2006.01)
(52) U.S. Cl. .................... 359/841; 359/872; 359/877
(58) Field of Classification Search .................. 359/841, 359/872, 877
See application file for complete search history.

(56) References Cited

U.S. PATENT DOCUMENTS

| | | | | |
|---|---|---|---|---|
| 4,893,916 A | * | 1/1990 | Sakuma et al. | 359/841 |
| 4,982,926 A | * | 1/1991 | Mori et al. | 248/479 |
| 5,432,641 A | * | 7/1995 | Mochizuki | 359/841 |
| 5,557,476 A | * | 9/1996 | Oishi | 359/841 |
| 5,734,517 A | * | 3/1998 | Kang | 359/877 |
| 6,022,113 A | | 2/2000 | Stolpe et al. | |
| 6,130,514 A | * | 10/2000 | Oesterholt et al. | 318/438 |
| 6,133,704 A | * | 10/2000 | Yoshida et al. | 318/466 |
| 6,257,731 B1 | * | 7/2001 | Oh | 359/872 |
| 6,322,221 B1 | | 11/2001 | Van de Loo | |
| 6,390,630 B1 | * | 5/2002 | Ochs | 359/841 |
| 6,543,902 B2 | * | 4/2003 | Bohm | 359/841 |
| 7,008,067 B2 | * | 3/2006 | Hsu | 359/841 |
| 7,543,949 B2 | * | 6/2009 | van den Brink et al. | 359/877 |
| 7,887,202 B1 | * | 2/2011 | Peterson | 359/841 |
| 2007/0029179 A1 | | 2/2007 | Brouwer et al. | |

FOREIGN PATENT DOCUMENTS

WO   2005075250   8/2005

OTHER PUBLICATIONS

Australian office action for patent application No. 200820355 dated Jul. 2, 2010.
European Search Report for application No. EP 09 16 5504 dated Feb. 2, 2010.

* cited by examiner

*Primary Examiner* — Ricky D Shafer
(74) *Attorney, Agent, or Firm* — Reising Ethington P.C.

(57) ABSTRACT

An external rear view mirror assembly to be fitted to a motor vehicle is disclosed. The assembly comprises: a mirror base mountable to a vehicle; a mirror head frame rotatably mounted to the base for rotation about a mirror head axis; a detent operably interposed between the base and the frame; a spring acting between the frame and the base in a direction parallel to the axis, the spring for holding the detent engaged; and a power fold mechanism operably interposed between the base and the frame, the power fold mechanism having a drive train and a clutch mechanism, the clutch mechanism comprising a pair of axially spaced apart clutching faces, connecting the drive train to the base when the drive train is driving, the clutch mechanism arranged and constructed such that forces are not transmitted from the frame to the drive train when the drive train is not driving.

4 Claims, 5 Drawing Sheets

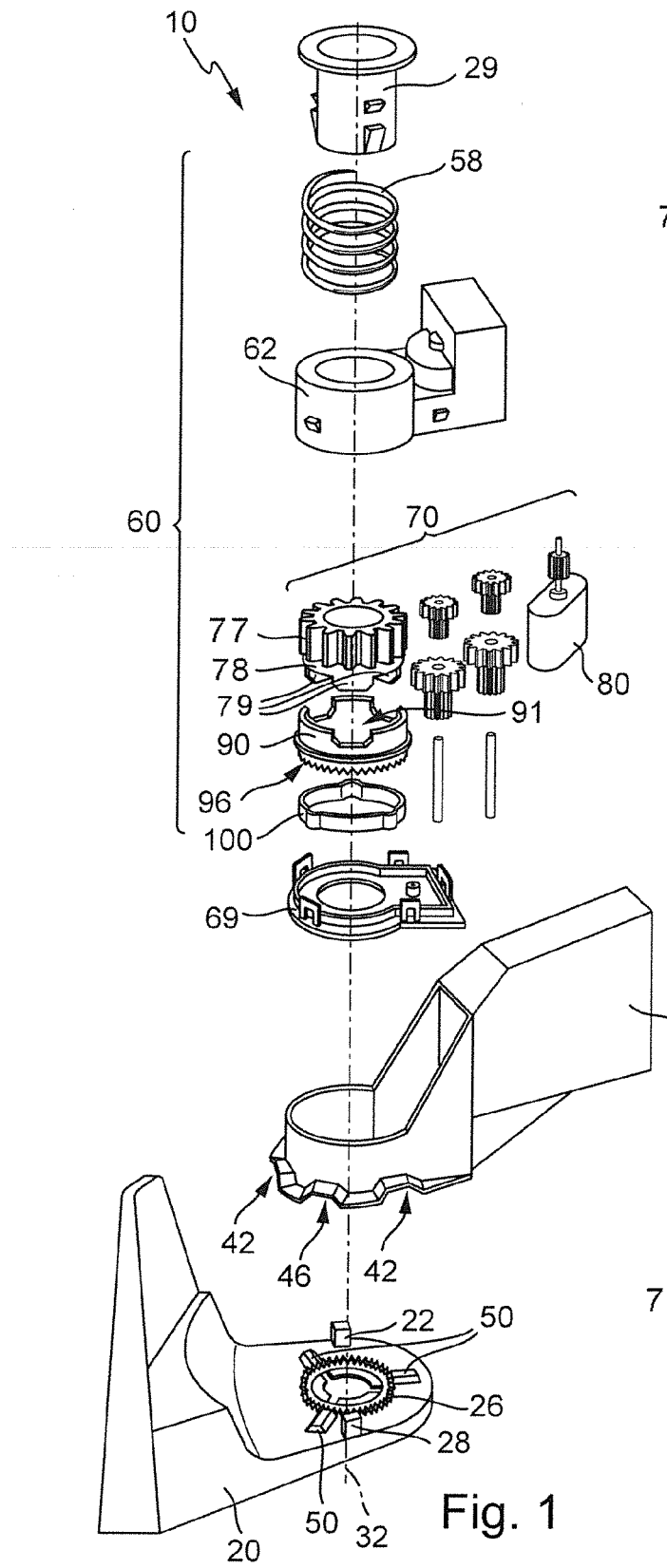
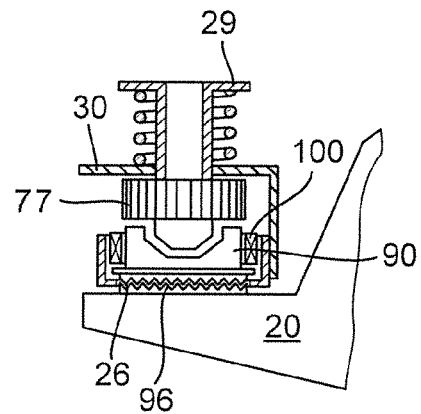
Fig. 2
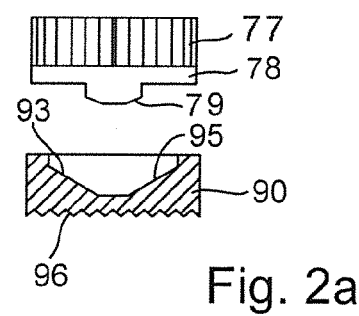
Fig. 2a
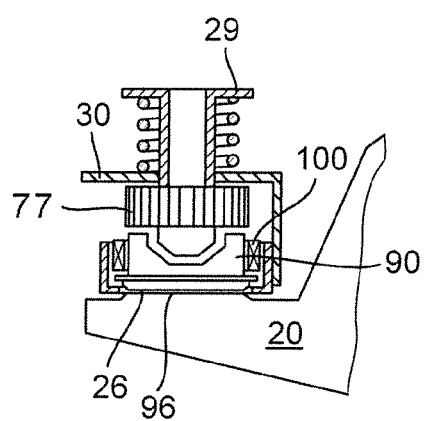
Fig. 2b
Fig. 1

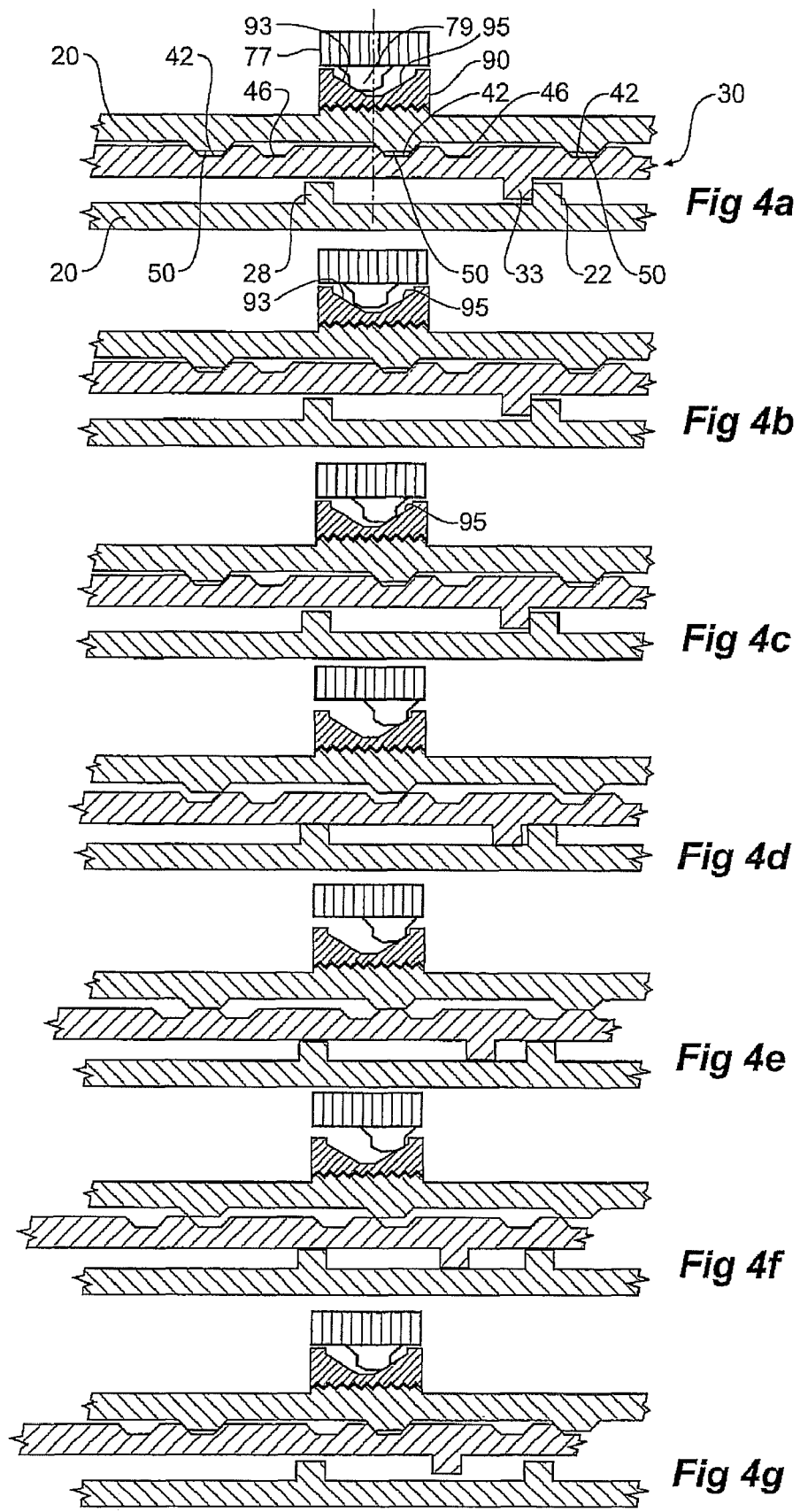

VEHICLE MIRROR POWER FOLD MECHANISM

The invention is based on a priority patent application AU2008203505 which is hereby incorporated by reference.

BACKGROUND ART

1. Field of Invention

The present invention relates to power fold mechanisms for external rear vision mirrors of motor vehicles.

2. Background of the Invention

Motor vehicles typically have two external rear vision mirror assemblies. The mirror assemblies typically have a mirror head that is designed to rotate about a substantially vertical pivot axis in both forward and rearward directions. The mirror head is typically held in its driving position by a detent which allows manual movement of the mirror head to a parked position and manual movement to a forward position. There are a number of reasons for this. One reason is safety. By having a mirror that can "break away" to move from a deployed position to a parked or forward position, injury to people can be minimised. Furthermore, damage to the mirror head can be minimised by allowing it to move when it hits obstructions. It is also useful to have a mirror head that can be parked, that is rotated to a position substantially parallel to the side of the vehicle, so as to narrow the effective width of the vehicle. This is particularly useful when the vehicle is parked in or is travelling along narrow or congested roadways. It is also useful for loading vehicles onto trucks for transport to be able to park the mirror heads.

Modern external rear vision mirrors, in addition to having a detent mechanism to hold the mirror head in a deployed position while at the same time enabling forward folding and rearward folding of the mirror head, also have electric drive systems to allow the operator to drive the head at least to its parked position. Some external rear view mirror assemblies have more sophisticated electric systems that allow the operator to redeploy the mirror head to a drive position after it has been manually pushed forward or rearward. These mirror systems are typically referred to as power fold mirrors.

Power fold mirrors typically employ power fold mechanisms that hold the mirror head against rotation in one direction with respect to the mirror base. This is usually achieved using a non-back-drivable gear train (such as a gear train employing a worm gear). As a result, the gear train is subject to significant forces and or torques resulting from wind, road and static forces. Thus, the power fold mechanism must be strong, rigid and have a good fastening system to both the mirror base and to the mirror frame. These requirements increase complexity and cost. They also mean that the mirror assembly must be specifically designed as a power fold mirror assembly with many different components to a non-power fold system.

An external rear view mirror for automobiles is disclosed in U.S. Pat. No. 6,022,113 (Stolpe et al). The rear view mirror disclosed by that US patent has a non-back-drivable worm gear that locks a gear wheel in place. The gear wheel can be driven by the worm gear but cannot drive back through the worm gear. Thus, the gear wheel can be used (and is used) as a stop, holding the drive housing 4 and hence the mirror head against fold path limiter stop cams on the mirror base 2. As a result, the gear train is subject to significant forces resulting from wind, road and static forces while it is held in the drive position. These forces are transmitted from the mirror head 3 to the powerfold housing 4 via a case frame in the mirror head. The force is then further transferred through the worm and gear teeth to the detent system on the bottom of the gear. Here it meets the reaction force provided by the spring that clamps the system. If the force supplied is great enough, the detent system will disengage compressing the spring and allowing the mirror head to manually rotate it to the parked position.

As should be apparent from the above, with the mirror described in U.S. Pat. No. 6,022,113, the powerfold housing 4, the drive train including gear wheel 6 and worm gear 11 are subject to significant forces and must be strong and rigid. Furthermore, the mirror of U.S. Pat. No. 6,022,113 cannot really be modified to become a non-powerfold mirror assembly.

It is an object of the present invention to provide an improved power fold mechanism that overcomes at least some of the problems outlined above or at least offers a useful choice.

SUMMARY OF THE INVENTION

According to a first aspect of the invention there is provided an external rear view mirror assembly to be fitted to a motor vehicle, the assembly comprising:

a mirror base mountable to a vehicle;

a mirror head frame rotatably mounted to the mirror base for rotation about a mirror head axis;

a detent operably interposed between the mirror base and the frame, the detent having at least a drive position;

a spring acting between the frame and the base in a direction parallel to the mirror head axis, the spring for holding the detent engaged in the detent position(s); and a power fold mechanism operably interposed between the mirror base and the frame, the power fold mechanism having a drive train and a clutch mechanism, the clutch mechanism comprising a pair of opposed clutching faces connecting the drive train to the base when the drive train is driving, the clutch mechanism arranged and constructed such that forces are not transmitted from the mirror head frame to the drive train when the drive train is not driving.

Preferably the detent has a detent gradient and the clutch mechanism has a clutch gradient, the detent gradient greater than the clutch gradient, such that rotation of the mirror head frame with respect to the mirror base causes disengagement of the clutch mechanism, thereby ensuring there are no force transmissions during manual folding of the mirror head frame with respect to the mirror base.

The clutching faces may comprise a plurality of mating teeth. Alternatively the clutching faces may comprise friction surfaces.

Preferably the clutch mechanism further comprises an axial displacement means for re-engaging the clutching faces, the axial displacement means translating rotational movement of the drive train to an axial displacement of one of the pair of clutching faces, the axial displacement connecting and disconnecting clutching faces.

Preferably the axial displacement means comprises:

a drive disc having a plurality of circumferentially spaced apart axially extending protrusions;

a ramp disc having a plurality of ramped recesses for receiving respective protrusions; and a drag spring operably interposed between the ramp disc and the mirror head frame, wherein rotation of the drive disc creates relative axial movement between the drive disc and the ramp disc as the protrusions follow the ramped recesses while the drag spring resists relative rotation between the ramp disc and the mirror head frame.

According to a second aspect of the invention there is provided a power fold mechanism for an external rear view mirror assembly to be fitted to a motor vehicle, the mirror assembly having:

a mirror base mountable to a vehicle;

a mirror head frame rotatably mounted to the mirror base for rotation about a mirror head axis;

a detent operably interposed between the mirror base and the frame, the detent having a drive position and a park position;

a spring acting between the frame and the base in a direction parallel to the mirror head axis, the spring for holding the detent engaged in the detent positions, the power fold mechanism comprising: a housing engagable by the spring so as to bias the mechanism towards the base along the head axis; a drive train; and a clutch mechanism comprising a pair of opposed clutching faces and an axial displacement means for re-engaging the clutching faces, the axial displacement means translating rotational movement of the drive train to an axial displacement of one of the pair of clutching faces, the axial displacement means comprising:

a drive disc having a plurality of circumferentially spaced apart axially extending protrusions;

a ramp disc having a plurality of ramped recesses for receiving respective protrusions; and a drag spring operably interposed between the ramp disc and the housing, wherein rotation of the drive disc creates relative axial movement between the drive disc and the ramp disc as the protrusions follow the ramped recesses while the drag spring resists relative rotation between the ramp disc and the housing.

The clutch faces may comprise a plurality of mating teeth. Alternatively the clutching faces may comprise friction surfaces.

Preferably the detent has a detent gradient and the clutch mechanism has a clutch gradient, the detent gradient greater than the clutch gradient, such that rotation of the mirror head frame with respect to the mirror base causes disengagement of the clutch mechanism, thereby ensuring there are no force transmissions during manual folding of the mirror head frame with respect to the mirror base.

According to a third aspect of the invention there is provide an external rear view mirror assembly for a vehicle, the assembly comprising:

a mirror base mountable to a vehicle;

a mirror head frame rotatably mounted to the mirror base for rotation about a mirror head axis;

a detent operably interposed between the mirror base and the frame, the detent having a drive position, the detent arranged to breakaway by relative movement between the frame and the base in a direction parallel to the mirror head axis;

a spring acting between the frame and the base in a direction parallel to the mirror head axis, the spring for holding the detent engaged in the detent positions; and a power fold mechanism operably interposed between the mirror base and the frame, characterised in that the mirror head frame is a unitary component having a mirror base engaging proximal end and a mirror mount supporting distal end, the proximal end and the mirror base mutually shaped to provide the detent, whereby aerodynamic forces from the mirror head are transmitted directly from the mirror head frame to the mirror base, their being only a single interface, between the mirror head frame and the mirror base.

A specific embodiment of the invention will now be described in some further detail with reference to and as illustrated in the accompanying figures. This embodiment is illustrative, and is not meant to be restrictive of the scope of the invention.

BRIEF DESCRIPTION OF THE DRAWINGS

A preferred embodiment of the invention is illustrated in the accompanying representations in which:

FIG. 1 shows an exploded perspective view of a fold mechanism for an external rear vision mirror to be fitted to a motor vehicle;

FIG. 2 is a diagrammatic cross sectional view of the power fold mechanism of FIG. 1;

FIG. 2a is a diagrammatic exploded view of a portion of the mechanism shown in FIG. 1;

FIG. 2b is a diagrammatic cross sectional view of another embodiment of the power fold mechanism of FIG. 1;

FIGS. 3a to 3g are a progressive diagrammatic drawings showing operation of the fold mechanism of FIGS. 1 and 2 during electric fold in;

FIGS. 4a to 4g are a progressive diagrammatic drawings showing operation of the fold mechanism of FIGS. 1 and 2 during electric fold out; and FIGS. 5a to 5f are a progressive diagrammatic drawings showing operation of the fold mechanism of FIGS. 1 and 2 during manual fold in.

DETAILED DESCRIPTION OF A PREFERRED EMBODIMENT OF THE INVENTION

Figure 5A:
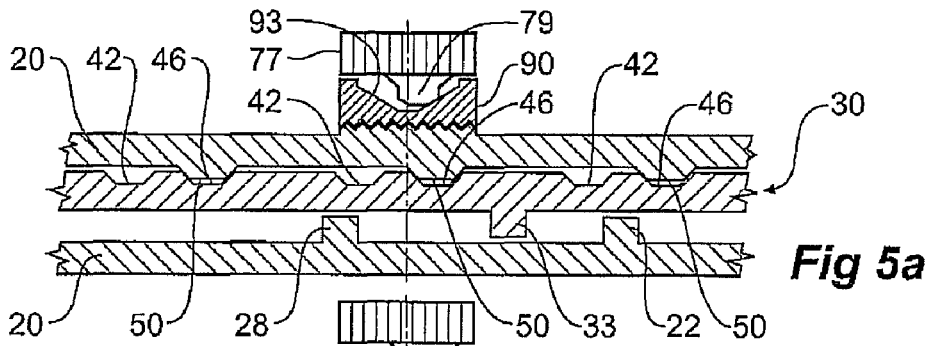
Figure 5B:
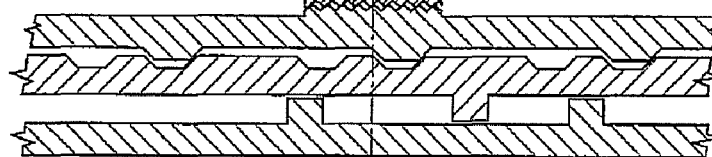
Figure 5C:
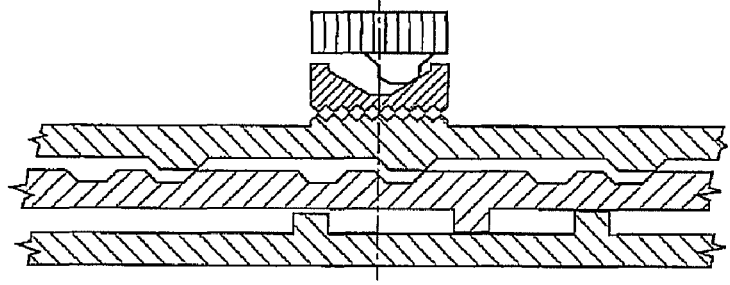
Figure 5D:
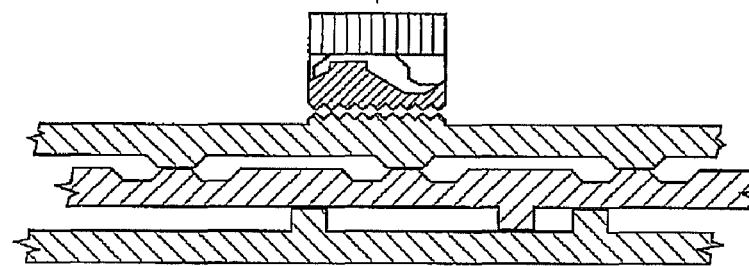
Figure 5E:
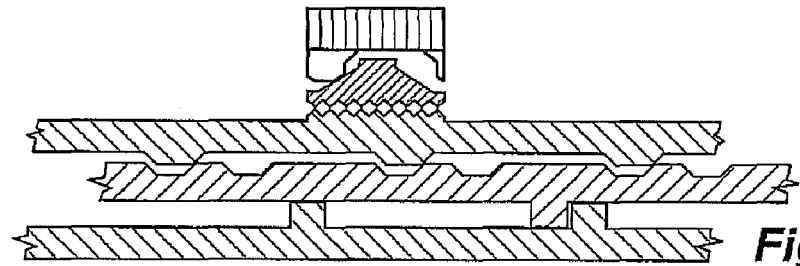
Figure 5F:
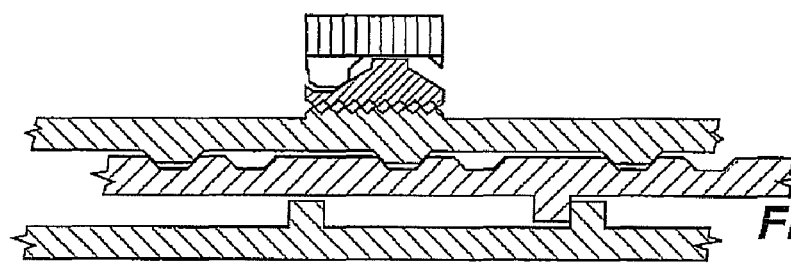
Figure 6:
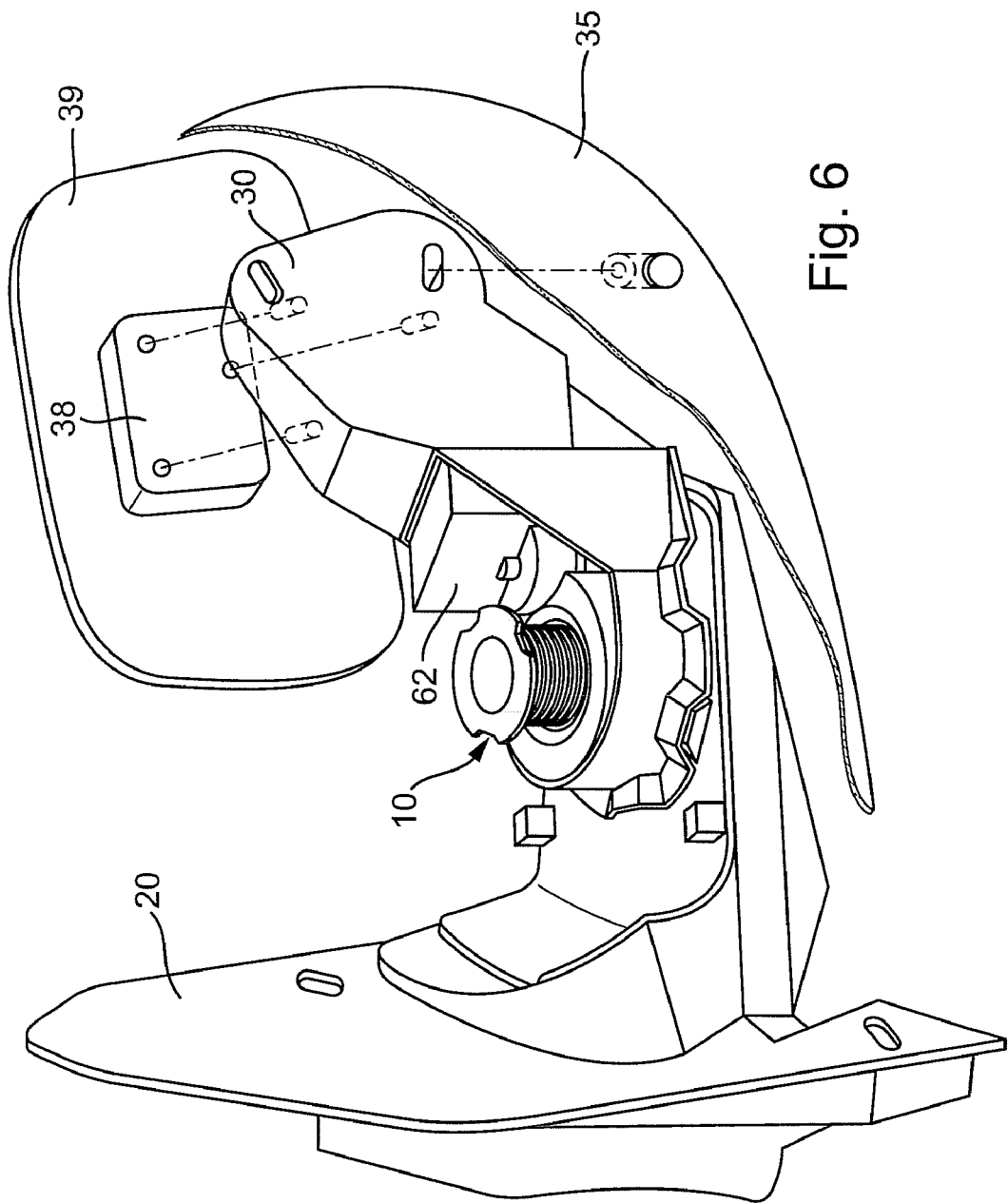
FIG. 6 is a perspective view, similar to that of FIG. 1, showing the mirror and mirror mount connection to the mirror frame and the mirror head aesthetic covering assembly's connection to the mirror frame.

In the embodiments of the invention shown in FIGS. 1 to 6, the power fold mechanism comprises a mirror base 20 mountable to a vehicle and a mirror head frame 30 rotatably mounted to the mirror base for rotation about a mirror head axis 32. The mirror head frame 30 will generally be a separate component from the aesthetic covering of the mirror head as is shown in FIG. 6. However, in other embodiments of the invention, not shown, the mirror head frame may be integral with the mirror head.

Referring to FIG. 6, it can be seen that mirror head includes a mirror aesthetic cover assembly 35 that attached directly to the mirror frame 30. A mirror mount 39, in this case including a mirror motor mechanism 38 also attaches to the mirror head frame 30. Aerodynamic forces from the mirror head are transmitted directly from the mirror head frame 30 to the mirror base 20.

The fold mechanism 10 further comprises a detent operably interposed between the mirror base 20 and the frame 30. Detent projections 50 cooperate with drive position detent recesses 46 and park position detent recesses 42 as shown in FIG. 1. A spring 58 acts between the frame 30 and base 20 in a direction parallel to the mirror head axis 32.

The spring 58 holds the detent engaged selectively in one or other of the drive position or the park position. A power fold mechanism 60 is operably interposed between the mirror base 20 and the frame 30. The power fold mechanism 60 illustrated has a back driveable electric drive train 70 and a clutch mechanism connecting the drive train 70 to the base 20 when the drive train 70 is driving and disconnecting the drive train 70 from the base 20 when the drive train 70 is not driving. In other embodiments of the invention, non-backdrivable electric gear train 70 may be used. For instance, gear trains having worm gears may be used.

The clutch mechanism comprises a pair of opposed clutching faces 26 and 96 and an axial displacement means. The axial displacement means translate rotational movement of the drive train 70, and specifically rotational movement of the gear drive 77, to the axial displacement of the upper clutching face 96 into engagement with the lower clutching face 26, thereby connecting the clutch faces 96 and 26. Similarly, axial movement of the upper clutching face 96 away from the lower clutching face 26 disconnects them.

With the embodiment of the invention shown in FIGS. 1, 2 and 2a, the clutching faces comprise a plurality of serrated matching teeth. In another embodiment of the invention shown in FIG. 2b, the clutching faces comprise friction faces. Various other clutch types (not shown) may also be used.

Referring again to FIGS. 1 and 2, it can be seen that the axial displacement means comprises a drive disc 78 and ramp disc 90. The drive disc has a plurality (in this case 3) of circumferentially spaced apart axially extending protrusions 79. The ramp disc 90 has a plurality of ramp recesses 91 for receiving respective protrusions 79. In another embodiment of the invention (not shown), a single protrusion 79 may be provided with a corresponding single recess 91.

Rotation of the drive disc 78 creates relative axial movement between the drive disc 78 and ramp disc 90 as the protrusions 79 follow the ramp recesses 91. This is more clearly shown in progressive FIGS. 3a to 3g.

With the embodiment of the invention illustrated the drawings, the drive disc 78 is integral with drive gear 77. In other embodiments of the invention, not shown, the drive gear 77 and the drive disc 78 may be separate components. Similarly, the ramp disc shown in the drawings has a lower face 96 that is a clutching face for engagement with lower clutching face 26 on the base 20. In other embodiments of the invention, the clutching face 96 may be on a separate but operably connected component to the ramp disc 90.

A drag spring 100 is operably interposed between the ramp disc 90 and the frame 30 (in this case through the power fold mechanism housing 62 or its cover 69 as shown in FIG. 2). The drag spring 100 is provided to produce sufficient reactive torque to allow the axial displacement means to operate before the clutching faces 96 and 26 engage as described above.

A housing 62 and cover 69 are provided to house the gear train and the clutch mechanism described above. A retainer 29 (or spigot) passes through the housing and locks using the bayonets fitting to the base 20. As can be seen in FIG. 2, the retainer 29 provides end stop for the coil spring 58 so that the coil spring 58 can exert an axial force onto the frame 30 via the housing 62 and its cover 69. This in turn allows the manual detent described above to function.

The clutch mechanism is arranged and constructed, such that forces are not transmitted from the mirror head frame to the drive train. If the embodiment of the invention shown in drawings, the detent has a detent gradient and a clutch has a clutch gradient, the detent gradient greater than a clutch gradient, such that rotation of the mirror head frame 30 with respect to the mirror base 20 causes disengagement of the clutch, thereby ensuring that there are no force transmissions during manual folding of the mirror head frame 30 with respect to the mirror base 20.

The steep clutch gradient produced by the serrations of the clutching faces 26 and 96 shown most clearly in FIG. 2a contrasts with a zero clutch gradient provided by the friction clutch shown in FIG. 2b.

Operation of the fold mechanism 10 described above will now be described with reference to the schematic drawings of FIGS. 3a to 3g, 4a to 4g, and 5a to 5f. These schematic drawings are provided to help explain the operation of the fold mechanism and do not necessarily depict the actual shapes or orientation of the various components.

Referring first to FIGS. 3a to 3g, electric fold in of the mirror frame (and hence the mirror head) form a diploid (drive) position to a folded (park) position.

Figure 3A:
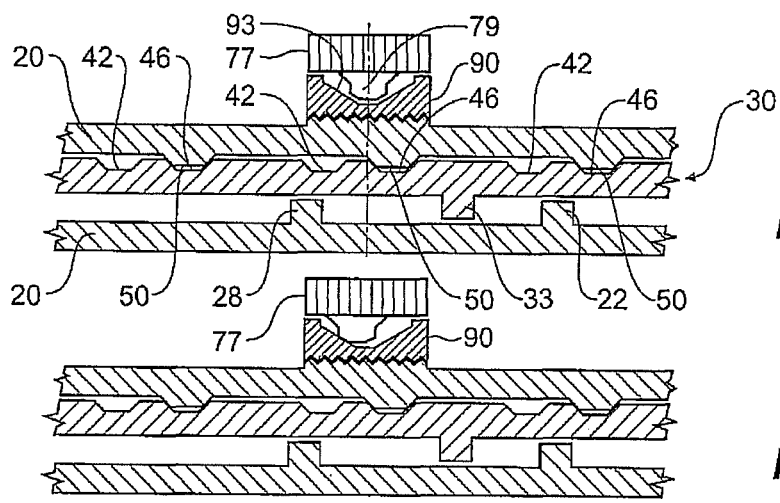

FIG. 3a shows diagrammatically the frame 30 securely held in the drive position with respect to the base 20 by the drive position detent. Specifically, the drive position detent projections 50 are engaged into the drive position detent recesses 46. A frame stop 33 is positioned in the intermediate position between the base forward fold end stop 28 and the base rearward fold end stop 22.

Figure 3B:
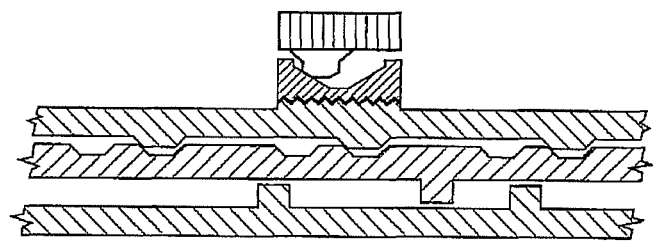

Power is applied to the motor 80 (in use, typically by the driver operating a switch inside of the vehicle to which the mirror assembly containing the fold mechanism is attached) and the drive train then transmits torque. As a result, drive gear 77, and integral drive disc 78 rotates with respect to both the frame 30 and base 20 (which are held together by the detent as described above) towards the position shown in FIG. 3b. As the protrusion 79 describes an arc around a circumferential path it rides against a first ramp 93 on the ramp disc 90. The ramp disc 90 is restrained from rotation by a drag spring 100 as illustrated in FIGS. 1 and 2. This results in the ramp disc 90 being driven axially downwards such that the clutching base 96 on the lower end of the ramp disc 90 engages with the upwardly facing clutching face 26 of the base 20 as is shown in FIG. 3b.

Figure 3C:
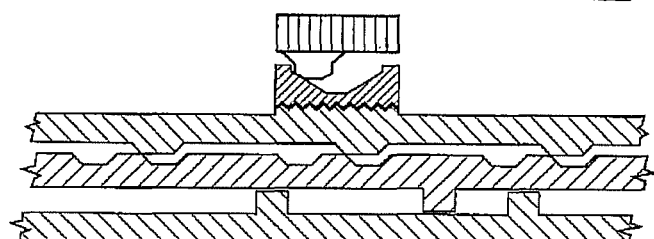
Figure 3D:
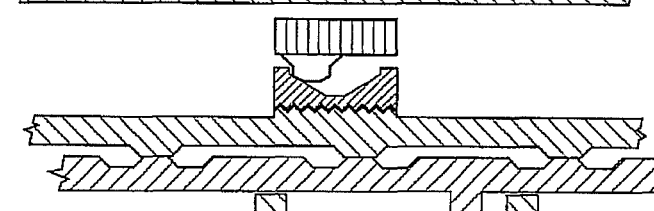
Figure 3E:
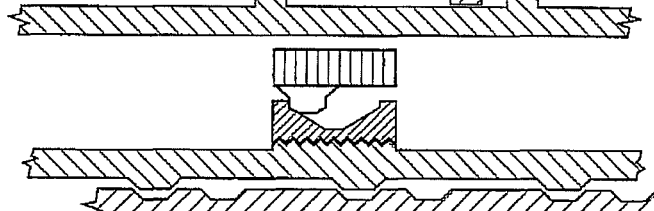
Figure 3F:
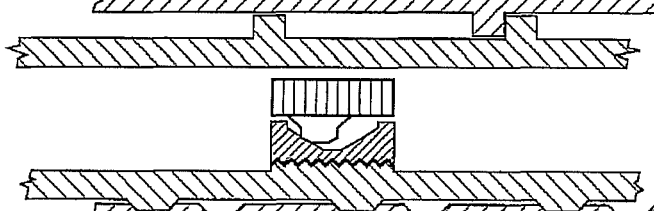

As the drive gear 77 continues to rotate with respect to the base 20, it is forced axially upwards by the ramp 93 as is shown in FIG. 3c this lifts up the frame 30 and causes the detents to commence disengagement. Once the detents have disengaged as is shown in FIG. 3d, the gear 77 stops rotating and the reaction load causes the frame 30 to rotate towards the fold in or park position. This continues until the frame stop 33 engages the base rearward fold end stop 22 as is shown in FIG. 3f. At this time, the frame 30 is held up above the base 20 until power is cut.

After power is cut (removed) the spring 58 causes the frame 30 to move axially downwards towards the base. The projection 79 slides down the ramp 93 causing the gear 77 to rotate back and the park position detent projections 52 to engage with the detent recesses 42 on the base as can be seen in FIG. 3g.

Electric fold out from the parked positioned back to the deployed or drive position will now be described with reference to schematic drawings FIGS. 4a to 4g.

Figure 3G:
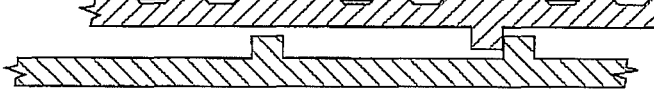

FIG. 4a is identical that of FIG. 3g and shows the fold mechanism in the parked position after it is electrically folded. Once power is applied to the motor 80 and hence the drive train, the gear and protrusions 79 rotate from the first ramp faces 93 across to the second ramp face 95 as is shown progressively in FIGS. 4b and 4c until the protrusions 79 engages the second ramp faces 95 as shown in FIG. 4c (the first and second ramp faces 93 and 95 are more clearly shown in FIG. 2a). As the ramp disc 90 is already engaged with the base 20 (after the electric fold in described above), the protrusions 79 depending from the drive disc 78 and drive gear 77 drives up the ramps 95 lifting the case 30, against spring force exerted by spring 58 and allowing the park position detents 42, 52 to disengage as is shown in FIG. 4d. The reaction load transmitted from the base 20 up through the clutching faces 26 and 96 or the ramp disc 90 causes the frame 30 and hence mirror head to rotate to the drive position as is shown in FIG. 4f.

Once power has been cut to the motor 80, the spring 58 will cause the detent to reengage in the drive position as is shown FIG. 4g and in a similar way as that described above with reference to FIG. 3g.

Manual fold in of the mirror head and hence mirror frame 30 with respect to the base 20 with now be described with reference to FIGS. 5a to 5f.

FIG. 5a is identical to that of FIG. 4g and shows the fold mechanism in its position after electric fold out. As the mirror head is manually rotated from the deployed position towards the parked position the frame 30 rides up the base detent as is shown in FIG. 5b. The resultant axial displacement lifts the ramp disc 90 away from the base 20 causing the clutching faces 96 and 26 to separate. As stated previously, the detent gradient is greater than the clutch gradient so that manual rotations and mirror head with respect to the mirror base causes disengagement of the clutch because of the relative gradient angles between the clutch and the detent as described above, this disengagement is immediate and prevents transmission of forces from the mirror head frame 30 to the drive train within the power fold mechanism 60. FIGS. 5d and 5e show progression of the mirror head and hence mirror frame towards the parked position with the ramp disc 70 completely separated from the base 20. FIG. 5f shows the fold mechanism reaching the parked position and the detents beginning to re-engage. In FIG. 5f, the detents have fully re-engaged and the ramp disc is pushed up in axial direction if the serrations of the clutching faces 26 and 96 are misaligned.

With the embodiment of the invention illustrated and described with reference to FIGS. 1 to 5f, the clutching faces 96 and 26 are serrated. In other embodiments of the invention, alternative clutching faces may be employed, for example a detent system or friction clutch such as the friction clutch shown in FIG. 2b.

With the embodiment of the invention described, a conventional manual fold detent system is used which enhances vibration performance and manual folding functions. Furthermore, because the power fold drive train is only operably connected between the frame 30 and base 20 during electric operation, all loads, including wind load, road transmitted loads, and static loads are transferred from the frame 30 to the base 20 through the manual detent system and the power fold mechanism is isolated from these loads. As a result, the power fold drive train and other components do not have the same strength and rigidity requirements of a conventional power fold system.

The operating logic of the power folding system described above is improved compared to prior art folding mirror heads. Combinations of manual and electric folding functions behave as expected, with the mirror head and frame being able to be returned to the drive position in one or two activations of a vehicle cabin mounted switch.

The provision of a park position detent that engages after manual fold in is a useful, but not essential feature as it positively holds the mirror in the parked position. This is important during car washing and during loading of vehicles onto trucks, trains or other vehicles.

The fold system described above has good vibration performance including after it has been manually folded to the drive position. Clutch reset is logical and does not result in clunking noise. There are no delays caused by clutch reset.

Having the electric folding mechanism out of the load path (other than when electrically actuating the mirror head) results in identical performance for both manual and power fold systems. This is in stark contrast to most power fold systems in which there is a summing of torques from both the manual and power fold systems during at least some manual operations.

While the present invention has been described in terms of a preferred embodiment in order to facilitate better understanding of the invention, it should be appreciated that various modifications can be made without departing from the principles of the invention. Therefore, the invention should be understood to include all such modifications within its scope.

The invention claimed is:

1. An external rear view mirror assembly to be fitted to a motor vehicle, the assembly comprising:
    a mirror base mountable to a vehicle;
    a mirror head frame rotatably mounted to the mirror base for rotation about a mirror head axis;
    a detent operably interposed between the mirror base and the frame, the detent having a drive position and a park position;
    a spring acting between the frame and the base in a direction parallel to the mirror head axis, the spring holding the detent engaged in one of the drive or park positions;
    a power fold mechanism operably interposed between the mirror base and the frame, the power fold mechanism having a drive train and a clutch mechanism, the clutch mechanism comprising a pair of opposed clutching faces connecting the drive train to the base when the drive train is driving, the clutch mechanism arranged and constructed such that forces are not transmitted from the mirror head frame to the drive train when the drive train is not driving;
    said clutch mechanism including an axial displacer operatively connected to clutch faces, said axial displacer connecting and disconnecting the clutch faces and translating rotational movement of the drive train to an axial displacement of one of the pair of clutch faces, said axial displacer including a drive disc having a plurality of circumferentially spaced apart axially extending protrusions, a ramp disc having a plurality of ramped recesses for receiving respective axially extending protrusions, and a drag spring operably interposed between the ramp disc and the mirror head frame, wherein rotation of the drive disc creates relative axial movement between the drive disc and the ramp disc as the axially extending protrusions follow the ramped recess while the drag spring resists relative rotation between the ramp disc and the mirror head frame.

2. An assembly as claimed in claim 1 wherein the detent has a detent gradient and the clutch mechanism has a clutch gradient, the detent gradient greater than the clutch gradient, such that rotation of the mirror head frame with respect to the mirror base causes disengagement of the clutch mechanism, thereby ensuring there are no force transmissions during manual folding of the mirror head frame with respect to the mirror base.

3. An assembly as claimed in claim 2 wherein the clutching faces comprise a plurality of mating teeth.

4. An assembly as claimed in claim 2 wherein the clutching faces comprise friction surfaces.

\* \* \* \* \*